United States Patent
Taba et al.

(10) Patent No.: US 11,238,347 B2
(45) Date of Patent: Feb. 1, 2022

(54) DATA DISTRIBUTION IN AN ARRAY OF NEURAL NETWORK CORES

(71) Applicant: INTERNATIONAL BUSINESS MACHINES CORPORATION, Armonk, NY (US)

(72) Inventors: Brian Taba, Cupertino, CA (US); Andrew S. Cassidy, San Jose, CA (US); Myron D. Flickner, San Jose, CA (US); Pallab Datta, San Jose, CA (US); Hartmut Penner, San Jose, CA (US); Rathinakumar Appuswamy, San Jose, CA (US); Jun Sawada, Austin, TX (US); John V. Arthur, Mountain View, CA (US); Dharmendra S. Modha, San Jose, CA (US); Steven K. Esser, San Jose, CA (US); Jennifer Klamo, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 797 days.

(21) Appl. No.: 16/146,632

(22) Filed: Sep. 28, 2018

(65) Prior Publication Data
US 2020/0104718 A1   Apr. 2, 2020

(51) Int. Cl.
*G06N 3/08* (2006.01)
*G06F 17/16* (2006.01)
(Continued)

(52) U.S. Cl.
CPC ............ *G06N 3/084* (2013.01); *G06F 17/16* (2013.01); *G06N 3/0454* (2013.01); *G06N 3/06* (2013.01)

(58) Field of Classification Search
None
See application file for complete search history.

(56) References Cited

U.S. PATENT DOCUMENTS 9,577,911 B1   2/2017   Castleman
9,632,729 B2   4/2017   Li et al.
(Continued)

OTHER PUBLICATIONS

Chen et al., Eyeriss: A Spatial Architecture for Energy-Efficient Dataflow for Convolutional Neural Networks, 2016 ACM/IEEE 43rd Annual International Symposium on Computer Architecture; pp. 367-379 (Year: 2016).*

(Continued)

*Primary Examiner* — Alan Chen
(74) *Attorney, Agent, or Firm* — Erik A. Huestis; Stephen J. Kenny; Foley Hoag, LLP

(57) ABSTRACT

Parallel processing among arrays of physical neural cores is provided. An array of neural cores is adapted to compute, in parallel, an output activation tensor of a neural network layer. A network is operatively connected to each of the neural cores. The output activation tensor is distributed across the neural cores. An input activation tensor is distributed across the neural cores. A weight tensor is distributed across the neural cores. Each neural core's computation comprises multiplying elements of a portion of the input activation tensor at that core with elements of a portion of the weight tensor at that core, and storing the summed products in a partial sum corresponding to an element of the output activation tensor. Each element of the output activation tensor is computed by accumulating all of the partial sums corresponding to that element via the network. The partial sums for each element of the output activation tensor are computed in a sequence of steps whose order is described by tracing a path through the weight tensor that (Continued)

visits every weight tensor element that contributes to any partial sum.

25 Claims, 33 Drawing Sheets

(51) Int. Cl.
    *G06N 3/06*     (2006.01)
    *G06N 3/04*     (2006.01)

(56) References Cited

U.S. PATENT DOCUMENTS

| | | |
|---|---|---|
| 9,659,249 B1 | 5/2017 | Copel |
| 2017/0193136 A1 | 7/2017 | Prasad et al. |
| 2017/0277658 A1 | 9/2017 | Pratas et al. |

OTHER PUBLICATIONS

Maji et al., ADaPT: Optimizing CNN inference on IoT and mobile devices using approximately separable 1-D kernels, IML '17, Liverpool, United Kingdom, 2017, pp. 1-12 (Year: 2017).*

Kang et al., B-Face: 0.2 mW CNN-Based Face Recognition Processor with Face Alignment for Mobile User Identification, IEEE, Symposium on VLSI Circuits Digest of Technical Papers, 2018, pp. 137-138 (Year: 2018).*

Anonymous, "A Method and System for Developing Communication-Optimized Distributed Learning Infrastructure over Clusters of Multi-GPU Nodes" (2016).

Anonymous, "Fast Simulation of Multiple Multi-Layer Neural Networks" (2016).

Anonymous, "Machine Learning Algorithms for Smart Meter Diagnostics" (2015).

Fox, "Massively Parallel Neural Computation" (2013).

Narayana, "An Artificial Neural Networks based Temperature Prediction framework for Network-on-Chip based Multicore Platform" (2016).

* cited by examiner

| Summation Order | Cycle | Partial Sum |
|---|---|---|
| | 1: | $Z_{ij} = W_{11} \cdot X_{(i-1)(j-1)}$ |
| | 2: | $Z_{ij} \mathrel{+}= W_{12} \cdot X_{(i-1)j}$ |
| | 3: | $Z_{ij} \mathrel{+}= W_{13} \cdot X_{(i-1)(j+1)}$ |
| | 4: | $Z_{ij} \mathrel{+}= W_{23} \cdot X_{i(j+1)}$ |
| | 5: | $Z_{ij} \mathrel{+}= W_{33} \cdot X_{(i+1)(j+1)}$ |
| | 6: | $Z_{ij} \mathrel{+}= W_{32} \cdot X_{(i+1)j}$ |
| | 7: | $Z_{ij} \mathrel{+}= W_{31} \cdot X_{(i+1)(j-1)}$ |
| | 8: | $Z_{ij} \mathrel{+}= W_{21} \cdot X_{i(j-1)}$ |
| | 9: | $Z_{ij} \mathrel{+}= W_{22} \cdot X_{ij}$ |

FIG. 10A

FIG. 20A ion, an exemplary pinwheel summation
path for an exemplary convolution according to

DATA DISTRIBUTION IN AN ARRAY OF NEURAL NETWORK CORES

BACKGROUND

Embodiments of the present disclosure relate to parallel processing among arrays of physical neural cores, and more specifically, to data distribution in an array of neural network cores.

BRIEF SUMMARY

According to embodiments of the present disclosure, systems for parallel processing among arrays of physical neural cores are provided. An array of neural cores is adapted to compute, in parallel, an output activation tensor of a neural network layer. A network is operatively connected to each of the neural cores. The output activation tensor is distributed across the neural cores. An input activation tensor is distributed across the neural cores. A weight tensor is distributed across the neural cores. Each neural core's computation comprises multiplying elements of a portion of the input activation tensor at that core with elements of a portion of the weight tensor at that core, and storing the summed products in a partial sum corresponding to an element of the output activation tensor. Each element of the output activation tensor is computed by accumulating all of the partial sums corresponding to that element via the network. The partial sums for each element of the output activation tensor are computed in a sequence of steps whose order is described by tracing a path through the weight tensor that visits every weight tensor element that contributes to any partial sum.

According to embodiments of the present disclosure, systems for parallel processing among arrays of physical neural cores are provided. In an array of neural cores, each is adapted to apply a weight tensor to a plurality of input activations to produce at least one output activation of a neural network layer. A network is operatively connected to each of the neural cores. Each neural core is configured to compute partial sums by traversing the weight tensor according to a programmable path. Each neural core is configured to communicate partial sums to at least one adjacent neural core within the array. Each neural core is configured to compute the at least one output activation from the partial sums.

According to embodiments of the present disclosure, methods of and computer program products for data distribution in an array of neural network cores are provided. In various embodiments, by each neural core of an array of neural cores, a weight tensor is applied to a plurality of input activations to compute partial sums in a sequence of steps whose order is described by tracing a path through the weight tensor that visits every weight tensor element that contributes to any partial sum. Partial sums are communicated to at least one adjacent neural core within the array via a network. At least one output activation of a neural network layer is computed from the partial sums.

According to embodiments of the present disclosure, methods of and computer program products for data distribution in an array of neural network cores are provided. In various embodiments, by each neural core of an array of neural cores, a weight tensor is applied to a plurality of input activations by traversing a weight tensor according to a programmable path to compute partial sums. Partial sums are communicated to at least one adjacent neural core within the array via a network. At least one output activation of a neural network layer is computed from the partial sums.

BRIEF DESCRIPTION OF THE SEVERAL VIEWS OF THE DRAWINGS

FIGS. 10A-C illustrate an exemplary pinwheel summation path for an exemplary convolution according to embodiments of the present disclosure.

FIG. 20A-B illustrate the weight order and input order for exemplary three-dimensional paths according to embodiments of the present disclosure

DETAILED DESCRIPTION

Figure 1:
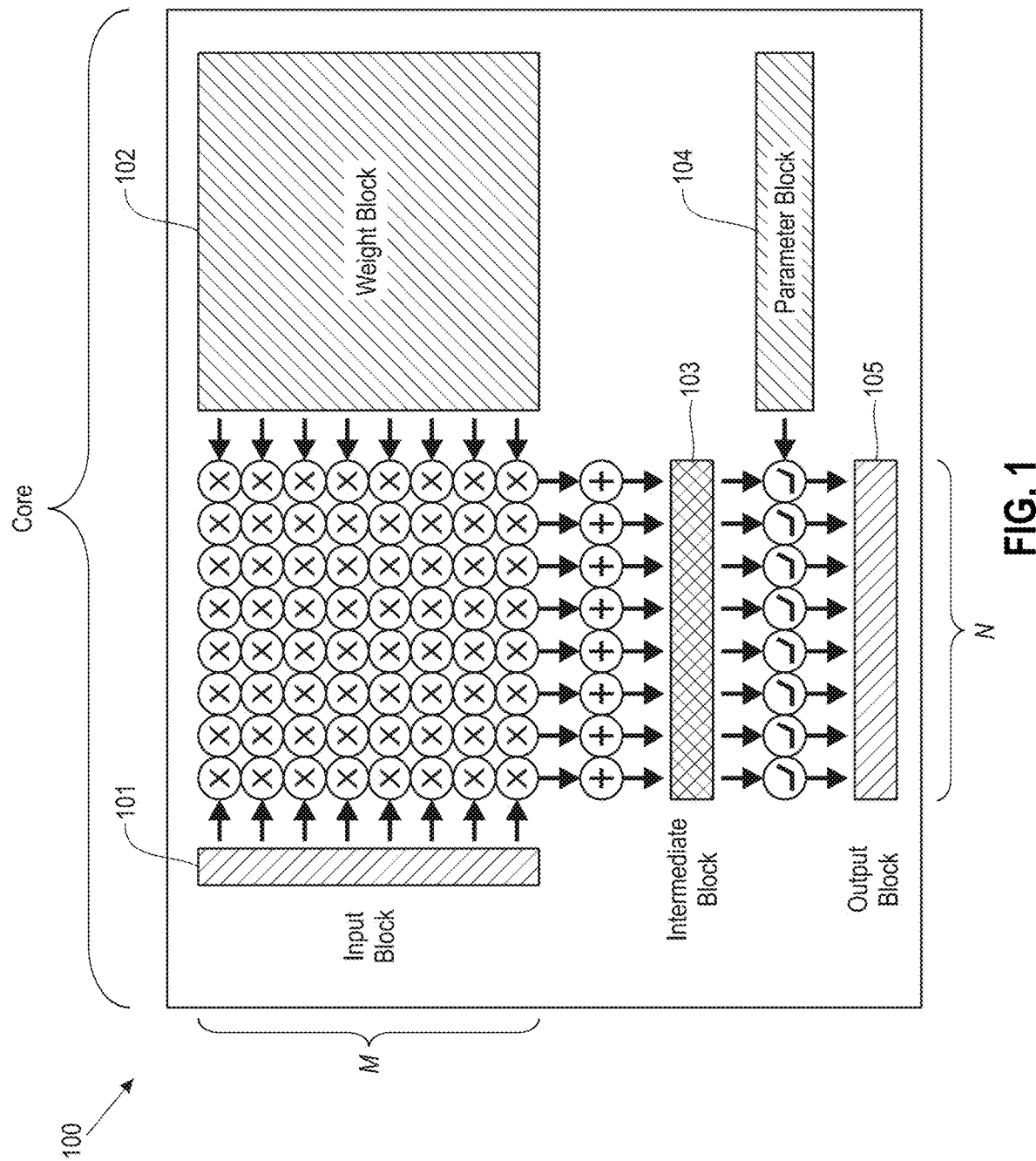
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function a.

An element of a layer's output data tensor Y can be computed as in Equation 1 where the neuron activation function c is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
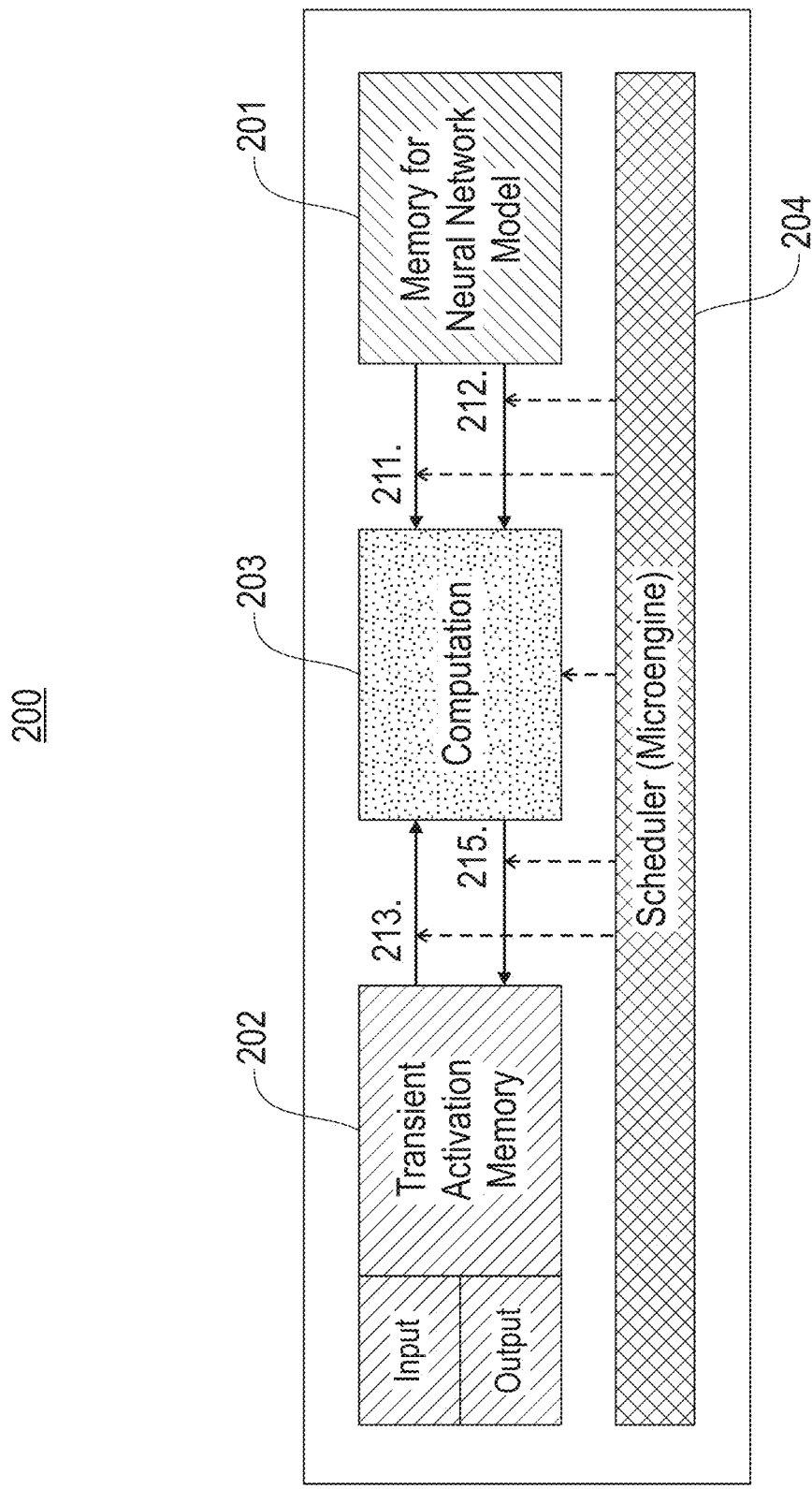
FIG. 2 illustrates an exemplary Inference Processing Unit (IPU) according to embodiments of the present disclosure.

Referring to FIG. 2, an exemplary Inference Processing Unit (IPU) is illustrated according to embodiments of the present disclosure. IPU 200 includes a memory 201 for the neural network model. As described above, the neural network model may include the synapse weights for a neural network to be computed. IPU 200 includes an activation memory 202, which may be transient. Activation memory 202 may be divided into input and output regions, and stores neuron activations for processing. IPU 200 includes a neural computation unit 203, which is loaded with a neural network model from model memory 201. Input activations are provided from activation memory 202 in advance of each computation step. Outputs from neural computation unit 203 are written back to activation memory 202 for processing on the same or another neural computation unit.

In various embodiments a scheduler 204 is included in IPU 200. In such embodiments, all operations in the IPU are directed by the scheduler. As set out below, central and/or distributed schedulers may be provided in various embodiments. A global scheduler may be referred to as a chip microengine, while a local scheduler may be referred to as a core microengine or local controller. In various embodiments a scheduler comprises one or more microengines, microcontrollers, state machines, CPUs, or other controllers.

Figure 3:
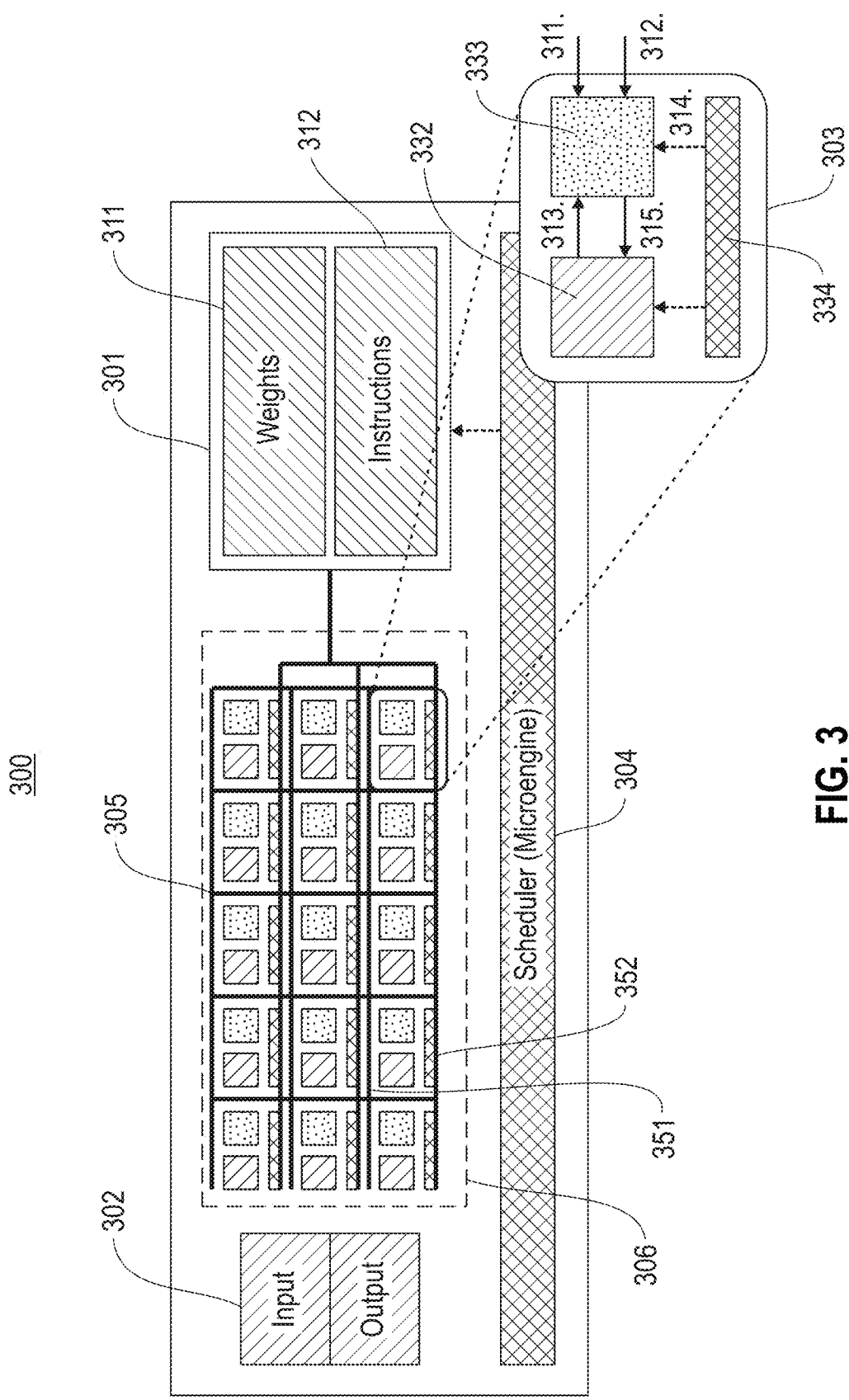
FIG. 3 illustrates a multi-core Inference Processing Unit (IPU) according to embodiments of the present disclosure.

Referring to FIG. 3, a multi-core Inference Processing Unit (IPU) is illustrated according to embodiments of the present disclosure. IPU 300 includes a model memory 301 for the neural network model. As described above, the neural network model may include the synapse weights for a neural network to be computed. IPU 300 includes an activation memory 302, which may be transient. Activation memory 302 may be divided into input and output regions, and stores neuron activations for processing. IPU 300 includes a plurality of cores 303. Each core 303 includes a neural computation unit 333, which is loaded with a neural network model from model memory 301. Each core also include a local activation memory 332. Input activations are provided from local activation memory 332 in advance of each computation step. Outputs from neural computation unit 333 are written back to activation memory 332 for processing on the same or another neural computation unit.

IPU 300 includes an array 306 of neural cores 303. Each core 303 includes a computation unit 333, which is loaded with a neural network model from model memory 301 and is operative to perform vector computation. Each core also includes a local activation memory 332. Input activations are provided from local activation memory 332 in advance of each computation step. Outputs from computation unit 333 are written back to activation memory 332 for processing on the same or another computation unit.

IPU 300 includes one or more network-on-chip (NoC) 305. In some embodiments, a partial sum NoC 351 interconnects the cores 303 and transports partial sums among them. In some embodiments, a separate parameter distribution NoC 352 connects cores 303 to memory 401 for distributing weights and instructions to cores 303. It will be appreciated that various configurations of NoC 351 and 352 are suitable for use according to the present disclosure. For example, broadcast networks, row broadcast networks, tree networks, and switched networks may be used.

In various embodiments a global scheduler 304 is included in IPU 300. In various embodiments, a local core controller 334 is included on each core 303. In such embodiments, the direction of operations is shared between the global scheduler (chip microengine) and the local core controller (core microengine). In particular, at 311, compute instructions are loaded from model memory 301 to the neural computation unit 333 on each core 303 by global scheduler 304. At 312, parameters (e.g., neural network/synaptic weights) are loaded from model memory 301 to the neural computation unit 333 on each core 303 by global scheduler 304. At 313, neural network activation data are loaded from activation local activation memory 332 to neural computation unit 333 on each core 303 by local core controller 334. As noted above, the activations are provided to the axons of the particular neural network defined by the model, and may originate from the same or another neural computation unit, or from outside the system. At 314, neural computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. At 315, the results from computation are stored in local activation memory 332 as directed by local core controller 334. As described above, these stages may be pipelined, in order to provide efficient usage of the neural computation unit on each core. It will also be appreciated that inputs and outputs may be transferred from local activation memory 332 to global activation memory 302 according to the requirements of a given neural network.

Computation unit 333 performs the computation to generate output neuron activations as directed by local core controller 334. In particular, the computation comprises applying the input synaptic weights to the input activations. It will be appreciated that various methods are available for performing such computations, including in silico dendrites, as well as vector multiplication units. The results from computation are stored in local activation memory 332 as directed by local core controller 334. These stages may be pipelined, in order to provide efficient usage of the computation unit on each core. It will also be appreciated that inputs and outputs may be transferred from local activation memory 332 to global activation memory 302 according to the requirements of a given neural network.

Accordingly, the present disclosure provides for runtime scheduling of operations in an Inference Processing Unit (IPU). In some embodiments, the operation scheduler is centralized (single scheduler). In some embodiments, the IPU computation is distributed (performed by an array of cores). In some embodiments, runtime scheduling of operations is hierarchical—both a central scheduler and distributed schedulers participate.

The scheduler or schedulers direct the execution of all operations in the IPU. Each scheduler instruction corresponds to several sub-operations (e.g., address generation, load, compute, store, etc.) In the distributed case, core microcode is run on the core microengines (e.g., 334). The core microcode includes instruction(s) to execute a full, single tensor operation. For example, a convolution between a weight tensor and a data tensor. In the context of a single core, the core microcode includes instruction(s) to execute a single tensor operation on the locally stored subset of the data tensor (and partial sums). Chip microcode is run on the chip microengine (e.g., 304). Microcode includes instructions to execute all of the tensor operations in a neural network.

The present disclosure provides for communication among the neural cores in an on-chip array as described above. In some embodiments, an on-chip network is used. In some embodiments, data are communicated between adjacent cores using programmable paths. In some embodiments, neighboring cores on the chip are connected by the on-chip network. In some embodiments, intermediate computation results (e.g., partial sums) are communicated among the cores. In some embodiments, final computation results (e.g., activations) are communicated among the cores. In this way, various distributed computations are performed.

As set out above, in various embodiments, each neural core implements a part of the larger neural network model. The cores collaborate via inter-core communication to achieve the full result. This is achieved via an on-chip network interconnecting neural cores.

In some embodiments, neural cores communicate with cores to their left, their right, their top, and their bottom. In some embodiments, neural cores can communicate freely to any other addressable core. Data communicated from one core to a second core may contribute to a computation in the second core, be stored in local memory in the second core, be forwarded to a third core, or any combination of the above.

In some embodiments, communication of the data between cores follows a programmable path. In some embodiments, each neural core in an array executes independent microcode to communicate intermediate or final results to neighboring cores to compute final results. In some embodiments, the communication of data within the core array follows a logical path consisting of one or more space-filling curves that collectively visit every element of the data and model tensors in the computation.

Figure 4A:
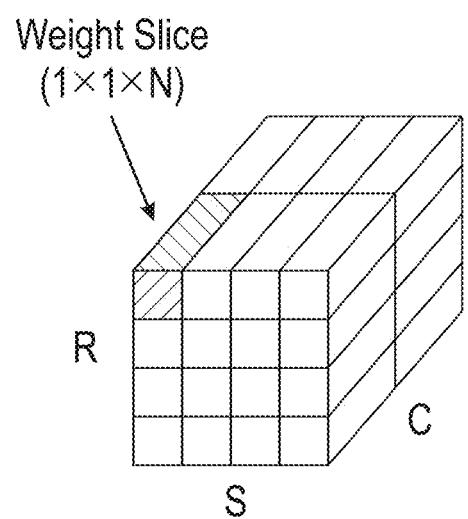
FIGS. 4A-E illustrate exemplary tensors according to embodiments of the present disclosure.
Figure 4B:
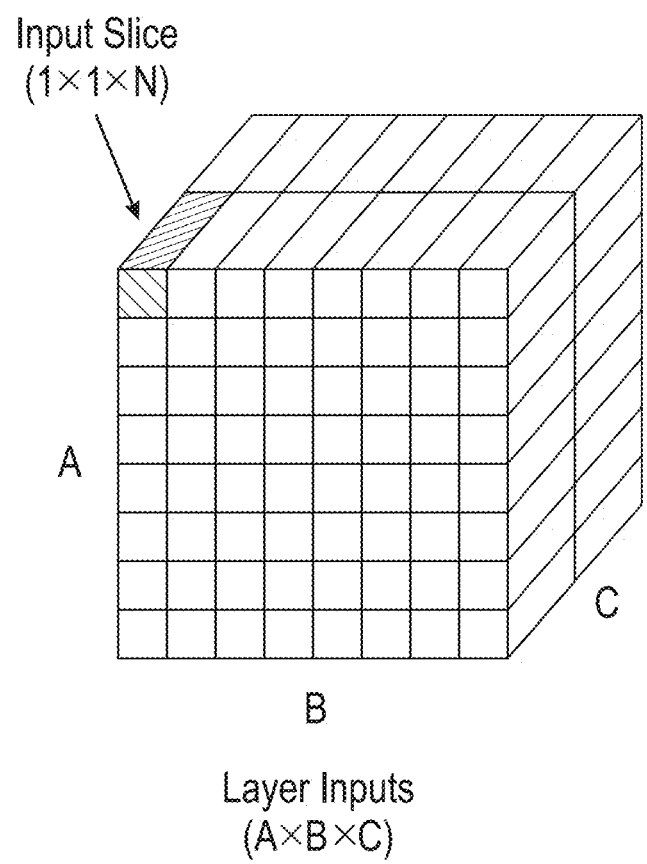
Figure 4C:
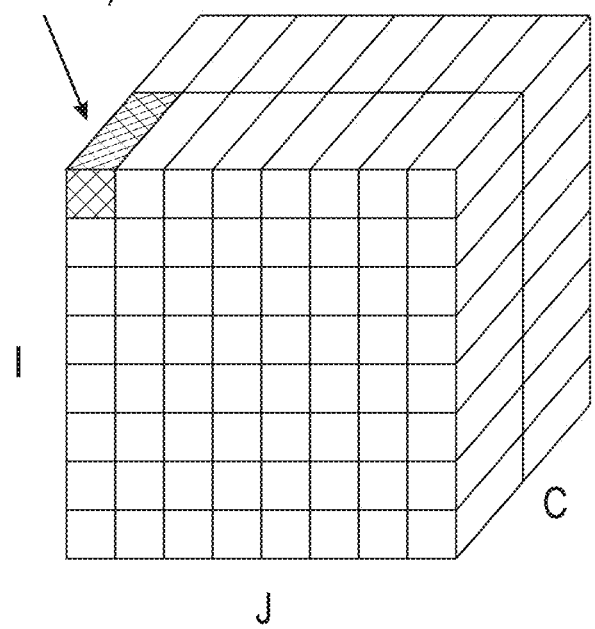
Figure 4D:
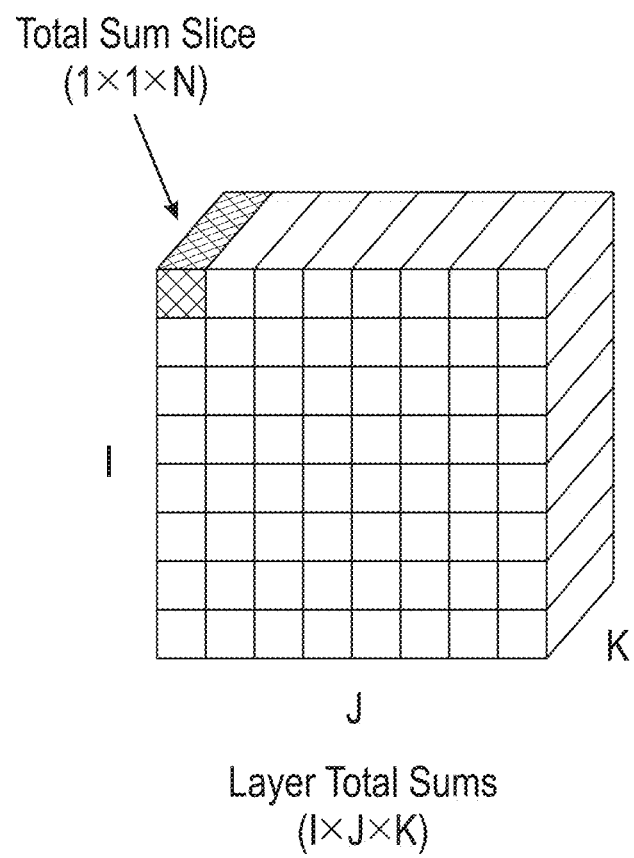
Figure 4E:
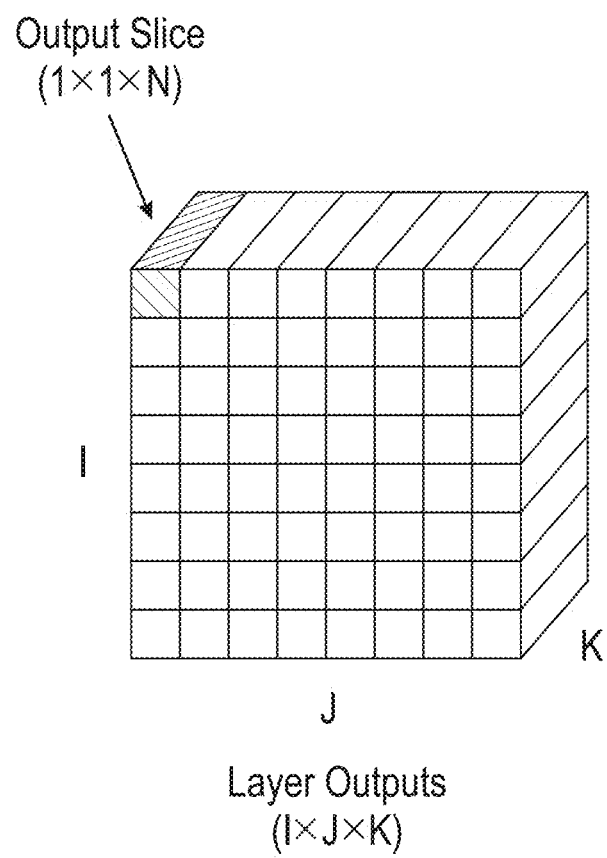

Referring to FIGS. 4A-E, exemplary tensors are illustrated according to embodiments of the present disclosure. In FIG. 4A, an R×S×C tensor representing the weights for one filter in a neural network layer is illustrated. A given weight slice may be allocated to one neural core in an array. In FIG. 4B, an A×B×C tensor representing layer inputs is illustrated. A given input slice may be allocated to a given neural core at a given cycle. In FIG. 4C, an I×J×C×K tensor representing the layer partial sums is illustrated. A given slice of partial sums may be produced by a given core in a given cycle. In FIG. 4D, an I×J×K tensor illustrating total sums for a layer is illustrated. A given total sum slice may be produced by a given core in a given cycle. In FIG. 4E, an I×J×K tensor representing a layer output is illustrated.

Figure 5:
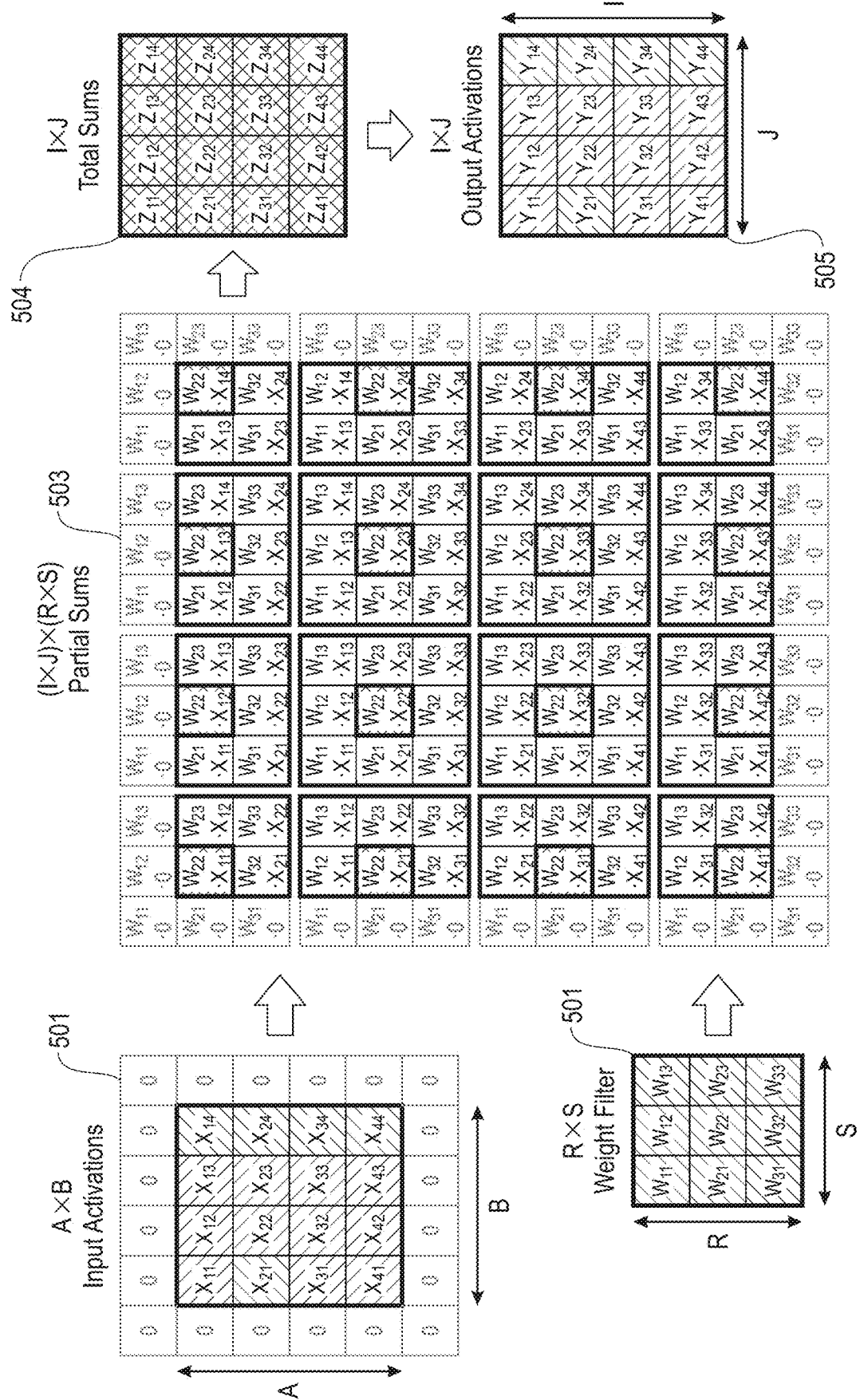
FIG. 5 illustrates an exemplary 3×3 convolution according to embodiments of the present disclosure.

Referring to FIG. 5, an exemplary 3×3 convolution is illustrated according to the present disclosure. In this example, an R×S weight filter 501 is applied to A×B input activations 502 (pictured here with zero-padding). The application of the weight filter to the segments of the input tensor yields partial sums 503. Total sums 504 are computed from partial sums 503, where $$Z_{ij} = \sum_{r,s} W_{rs} \cdot X_{(r-i+\lfloor \frac{R}{2} \rfloor)(s-j+\lfloor \frac{S}{2} \rfloor)}$$

and zero-padding of the input activations sets $X_{ab}=0$ if $a \notin [1,A]$ or $b \notin [1,B]$. Output activations 505 are computed from total sums 504, where $Y_{ij}=\sigma(Z_{ij})$.

Figure 6A:
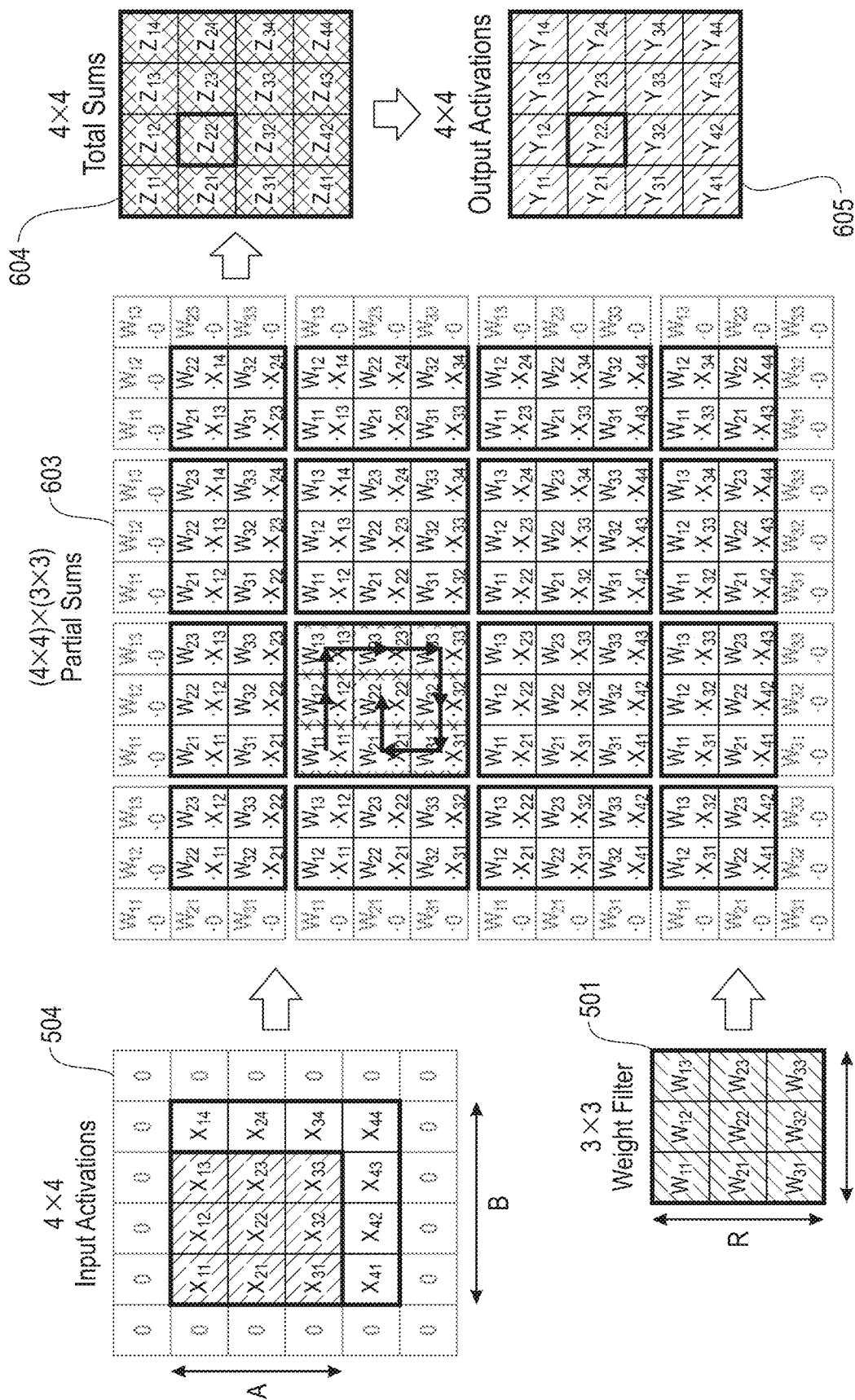
FIGS. 6A-B illustrate an exemplary spiral summation path for an exemplary convolution according to embodiments of the present disclosure.

Referring to FIG. 6A, an exemplary spiral summation path for an exemplary convolution is illustrated. In this example, a 3×3 weight filter 601 is applied to 4×4 input activations 602 (pictured here with zero-padding). The application of the weight filter to the segments of the input tensor yields partial sums 603. Total sums 604 are computed from partial sums 603, where $$Z_{ij} = \sum_{r,s} W_{rs} \cdot X_{(r-i+\lfloor \frac{R}{2} \rfloor)(s-j+\lfloor \frac{S}{2} \rfloor)}$$

and zero-padding of the input activations sets $X_{ab}=0$ if $a \notin [1,A]$ or $b \notin [1,B]$. Output activations 605 are computed from total sums 604, where $Y_{ij}=\sigma(Z_{ij})$. In FIG. 6A, the computation of activation $Y_{22}$ is shown. As above, $Y_{22}=\sigma(Z_{22})$. In turn, $$Z_{22}=(W_{11} \cdot X_{11})+(W_{12} \cdot X_{12})+(W_{13} \cdot X_{13})+(W_{21} \cdot X_{21})+ (W_{22} \cdot X_{22})+(W_{23} \cdot X_{23})+(W_{31} \cdot X_{31})+(W_{32} \cdot 32)+ (W_{33} \cdot X_{33})$$

Figure 6B:
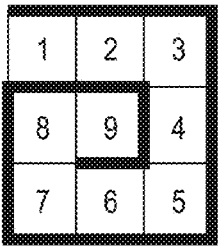

To produce total sum $Y_{22}$, the partial sums within a given segment are summed in the order given in FIG. 6B. In each cycle 1 . . . 9, the pictured partial sum is added to the total sum, following a spiral path through the 3×3 weight filter.

Figure 7A:
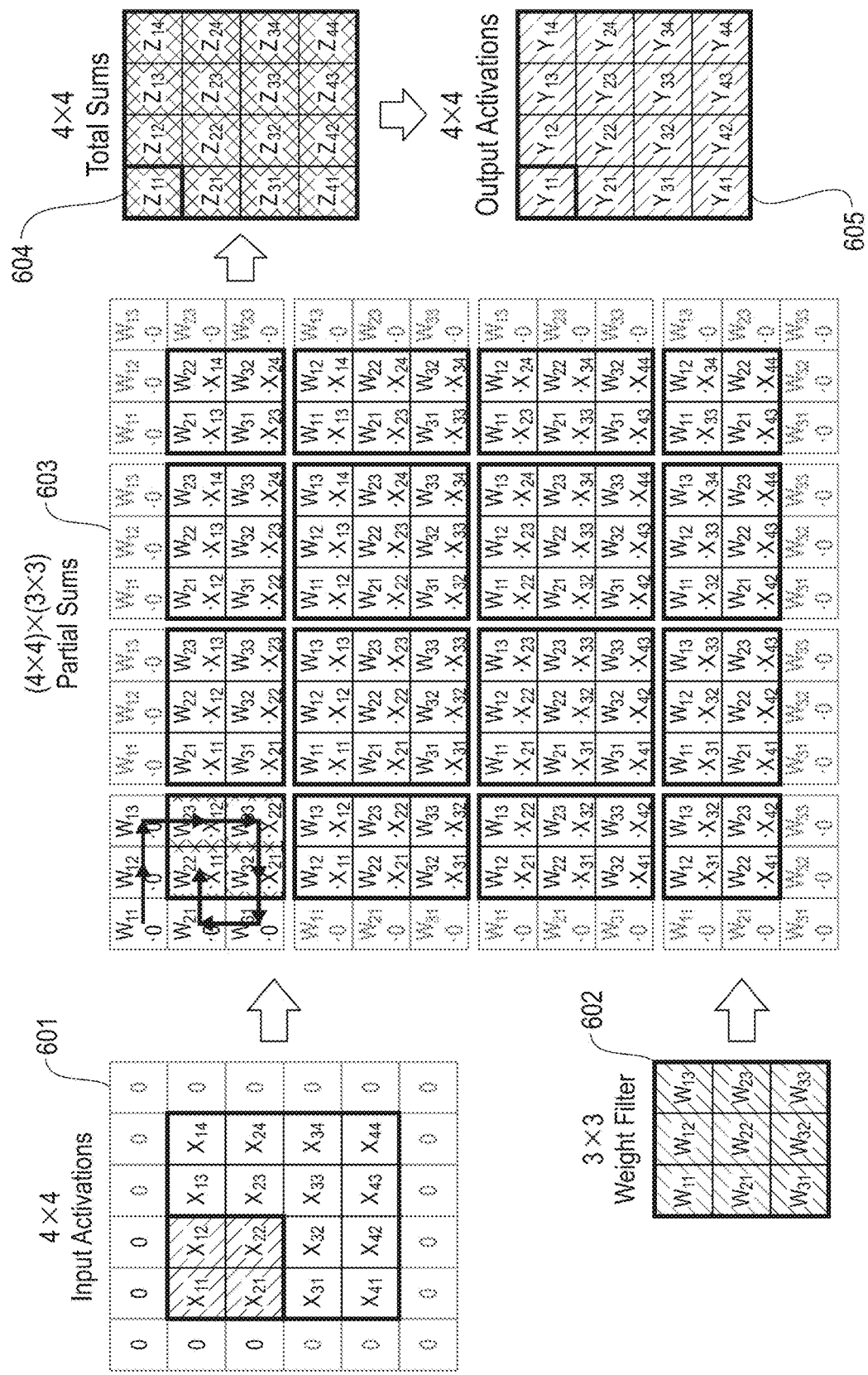
FIGS. 7A-B illustrate an exemplary spiral summation path for an exemplary convolution according to embodiments of the present disclosure.

Referring to FIG. 7A, the computation of activation $Y_{11}$ is shown. As above, $Y_{11}=\sigma(Z_{11})$. In turn, taking into account the zero-padding of the input activations, $$Z_{11}=(W_{11} \cdot 0)+(W_{12} \cdot 0)+(W_{13} \cdot 0)+(W_{21} \cdot 0)+(W_{22} \cdot X_{11})+ (W_{23} \cdot X_{12})+(W_{31} \cdot 0)+(W_{32} \cdot X_{21})+(W_{33} \cdot X_{22})$$

Figure 7B:
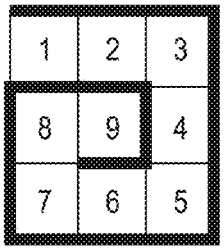

To produce total sum $Y_{11}$, the partial sums within a given segment are summed in the order given in FIG. 7B. In each cycle 1 . . . 9, the pictured partial sum is added to the total sum, following a spiral path through the 3×3 weight filter.

Figures 8A, 8B, 8C:
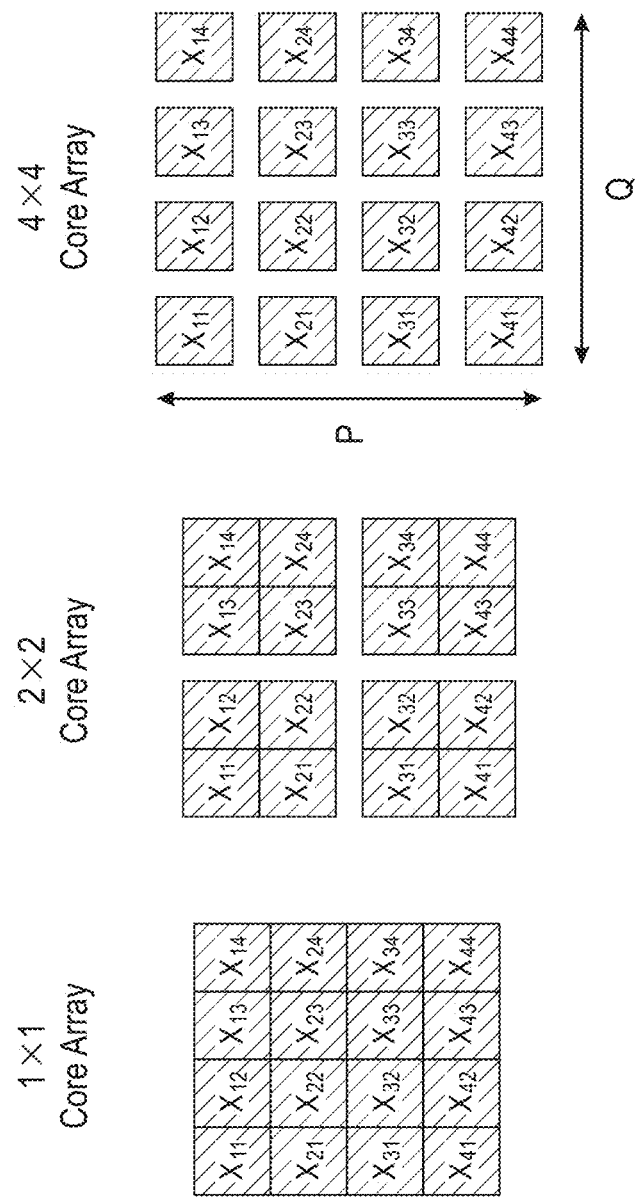
FIGS. 8A-C illustrate exemplary distributions of input activations among cores in an array according to embodiments of the present disclosure.

Referring to FIGS. 8A-C, exemplary distributions of input activations among cores in an array are illustrated. FIG. 8A shows an exemplary distribution over a 1×1 core array. FIG. 8B shows an exemplary distribution over a 2×2 core array. FIG. 8C shows an exemplary distribution over a 4×4 core array.

Figure 9B:
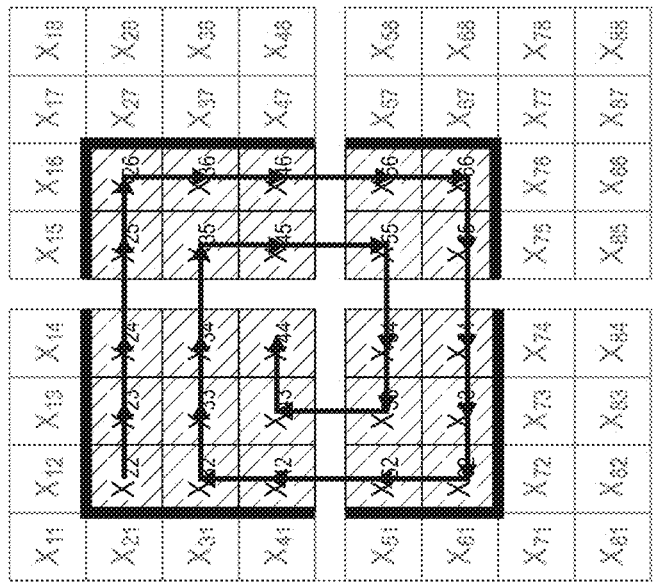
FIGS. 9A-C illustrate exemplary computation paths are illustrated, corresponding to the input activation distributions of FIGS. 8A-C.
Figure 9A:
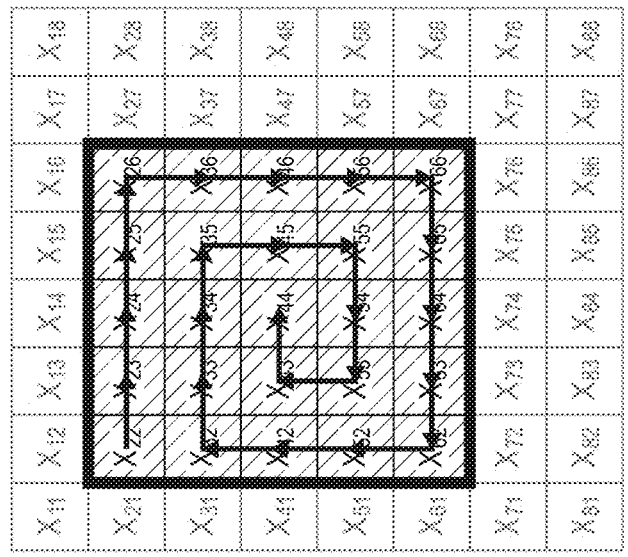
Figure 9C:
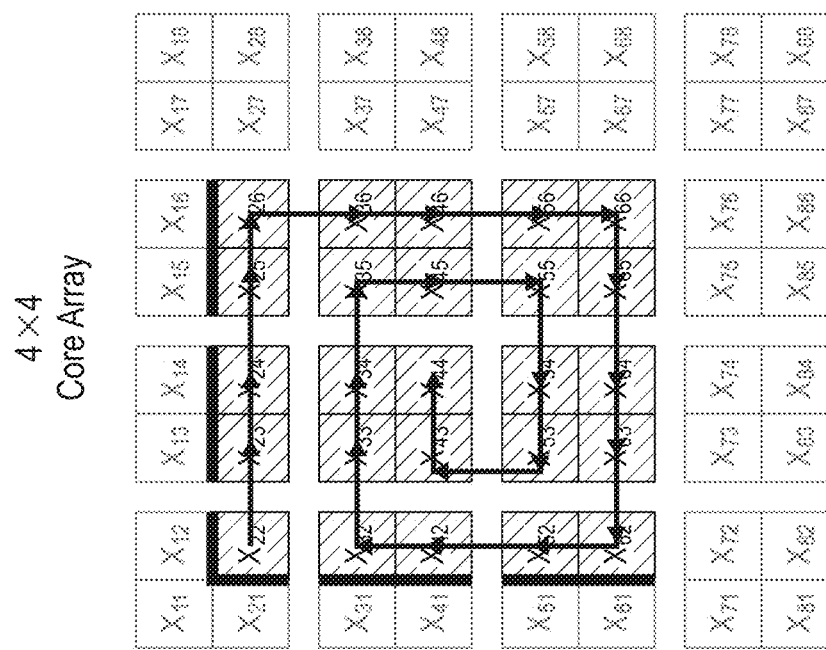

Referring to FIGS. 9A-C, exemplary computation paths are illustrated, for the application of a 5×5 weight filter to a single element of an 8×8 input tensor, where the input activations are distributed over a 1×1, 2×2, or 4×4 core array. It will be appreciated that summation of partial sums within a single core does not require inter-core communication of partial sums. In each instance where the summation path crosses a core boundary, a partial sum must be communicated via the on-chip network to the neighboring core.

Referring to FIG. 10A, an exemplary computation order is illustrated for accumulating a partial sum by following a pinwheel path through the weight filter.

Figure 10B:
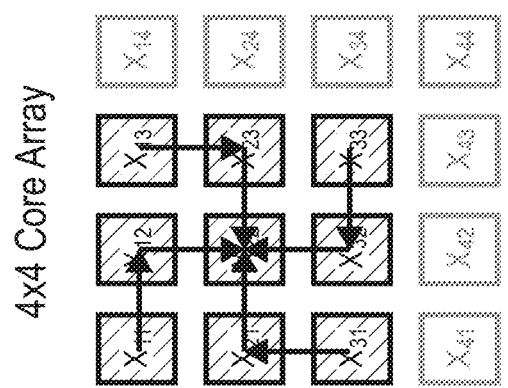

Referring to FIG. 10B, an exemplary pinwheel summation path is illustrated for the application of a 3×3 weight filter to a single element of a 4×4 input tensor, where the input activations are distributed over a 4×4 core array.

Figure 10C:
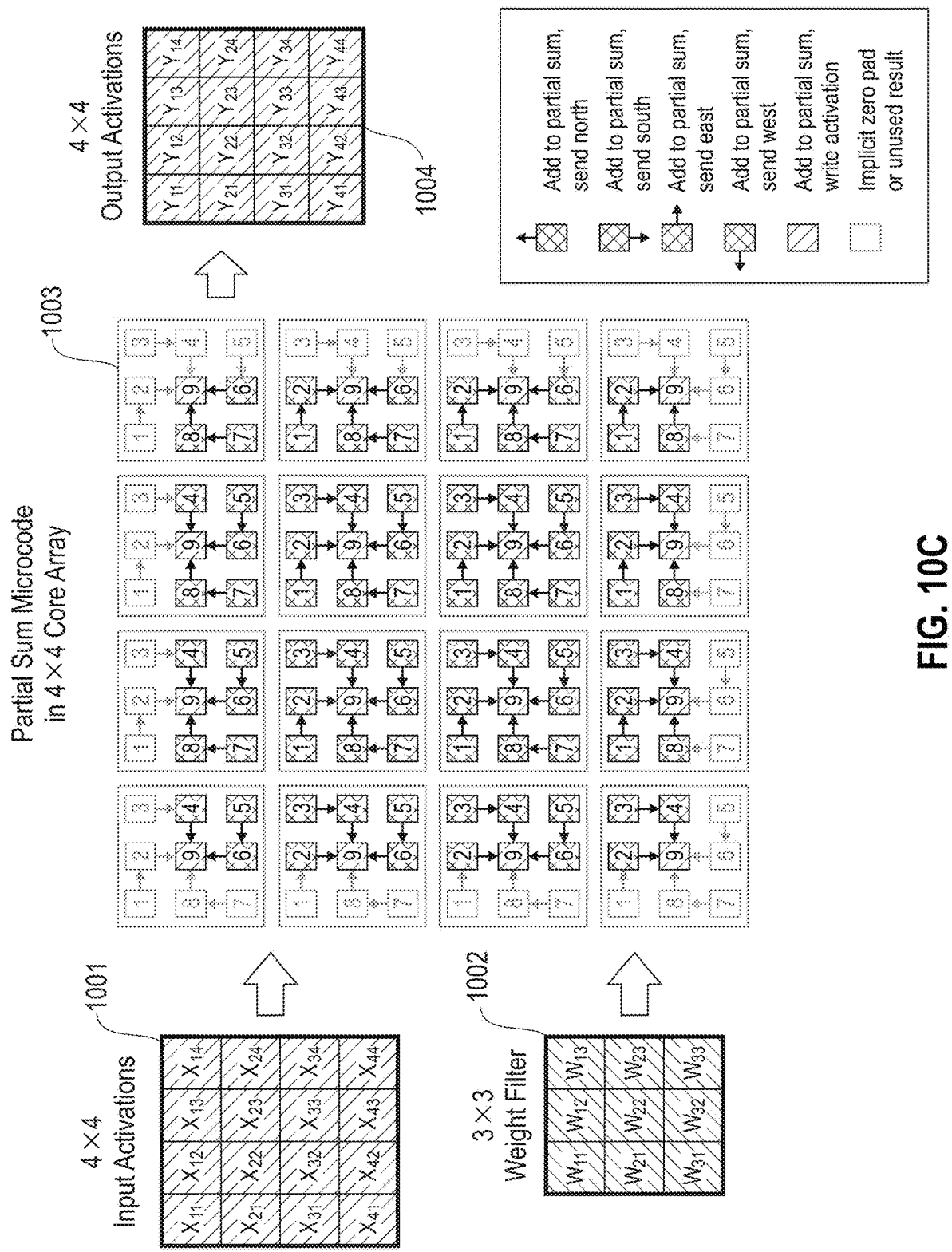

Referring to FIG. 10C, an exemplary pinwheel summation path for an exemplary convolution is illustrated. In this example, a 3×3 weight filter 1002 is applied to 4×4 input activations 1001 (pictured here without zero-padding) that are distributed over a 4×4 core array 1003. The application of the weight filter to the segments of the input tensor ultimately yields output activations 1004.

In FIG. 10C, the partial sum microcode distributed to each core in array 1003 is illustrated. In this example, every core in parallel executes the identical sequence of microcode instructions to compute partial sums in the order given in FIG. 10A. In FIG. 10C, the nine instructions in the sequence are diagrammed within each core in array 1003. Each instruction is numbered by its order of execution, and positioned to illustrate the spatial locations from which it retrieves elements of the weight filter and input tensor for multiplication. Arrows indicate the direction in which each instruction communicates the resulting partial sum to an adjacent core.

Figure 11A:
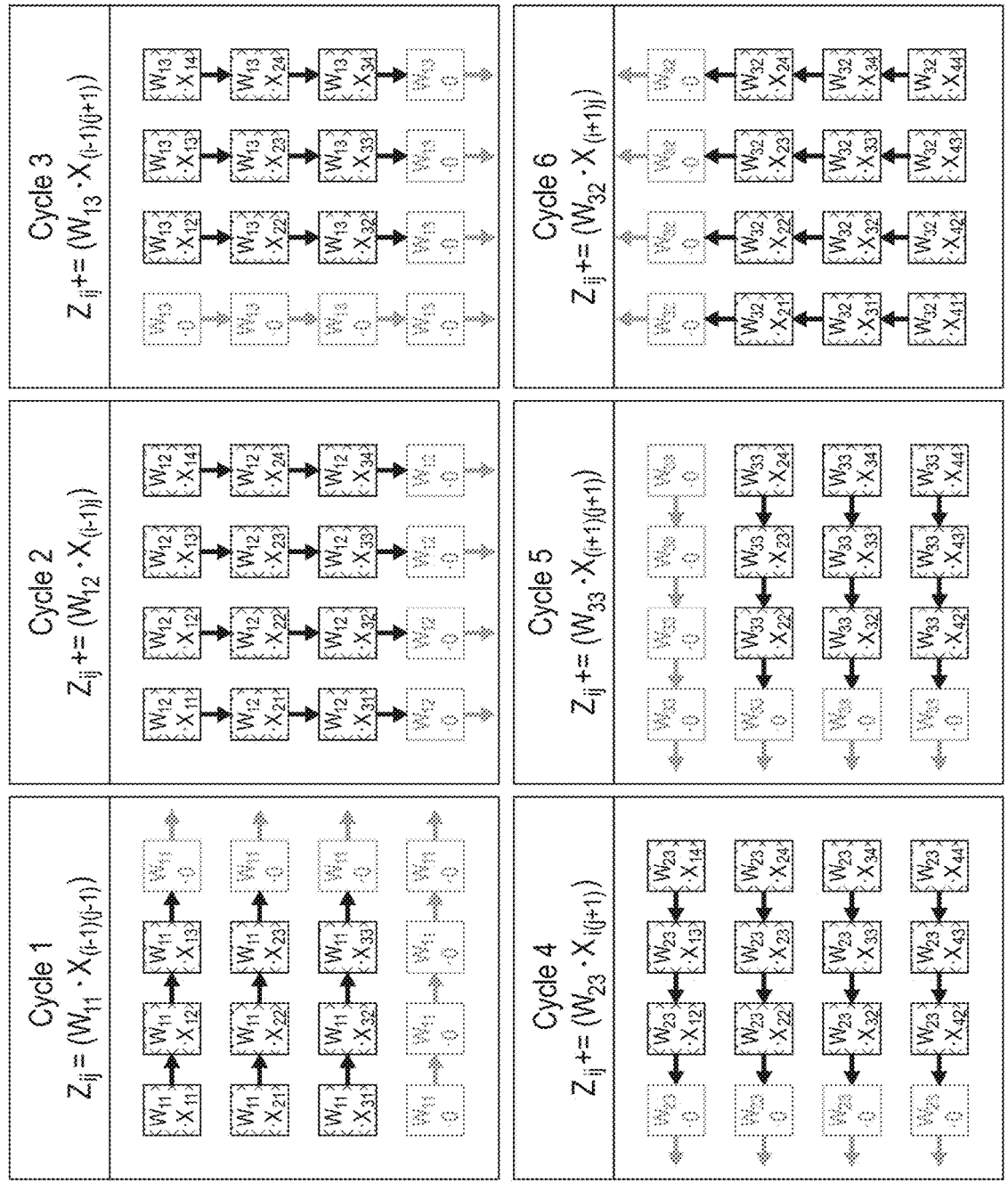
FIGS. 11A-B illustrates the computation cycles for the convolution of FIG. 10.
Figure 11B:
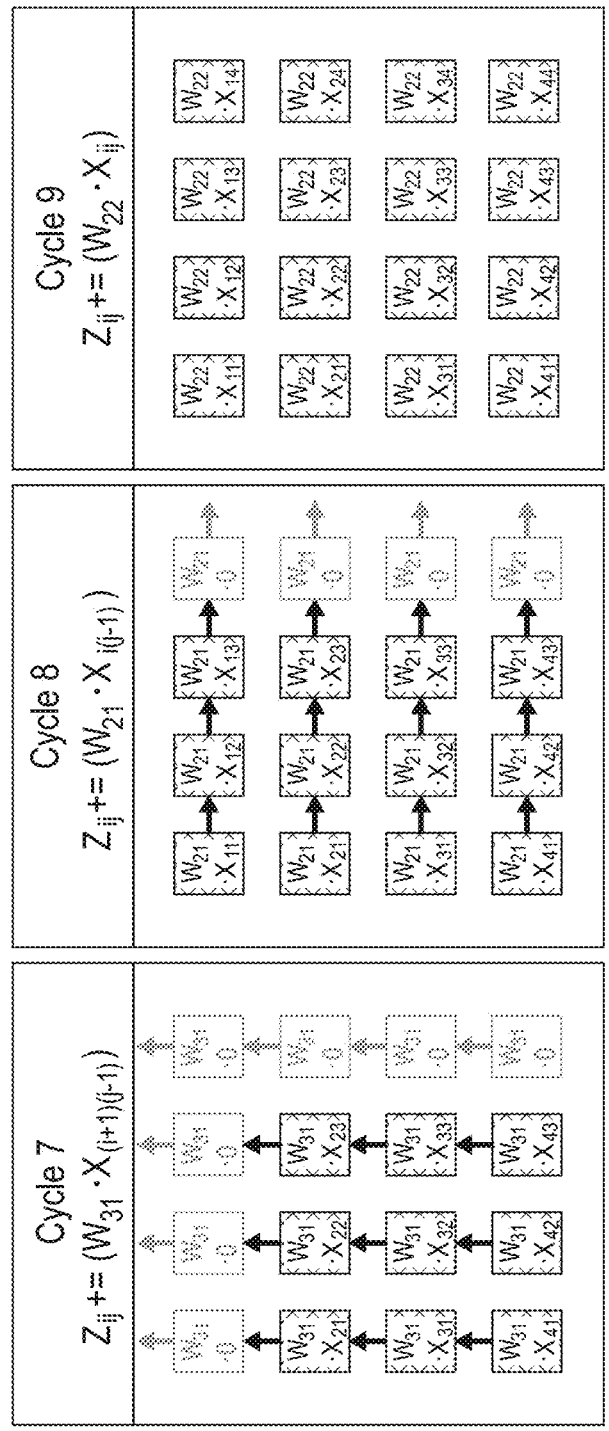
Figures 12A, 12B:
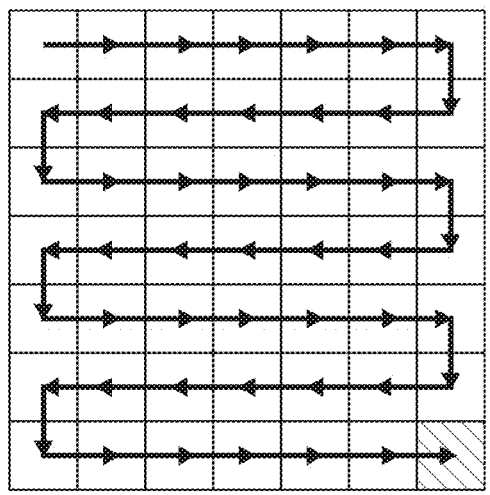
FIGS. 12A-F illustrates the weight order and input order for exemplary snake paths according to embodiments of the present disclosure.
Figures 12C, 12D:
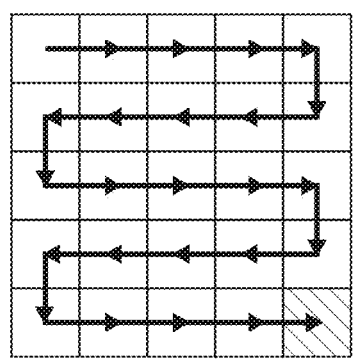
Figures 12E, 12F:
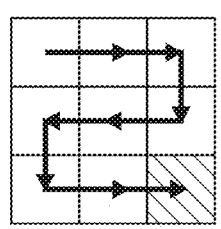
Figures 13A, 13B:
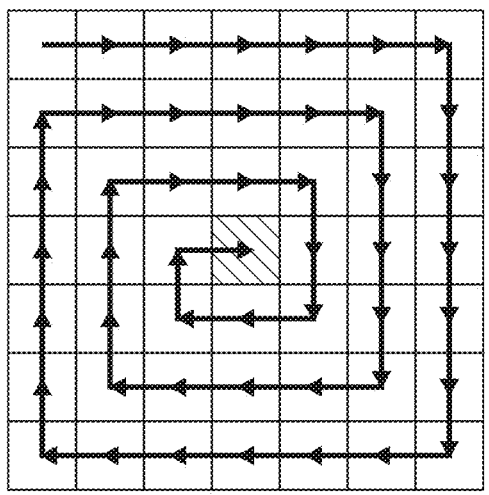
FIGS. 13A-F illustrates the weight order and input order for exemplary spiral paths according to embodiments of the present disclosure.
Figures 13C, 13D:
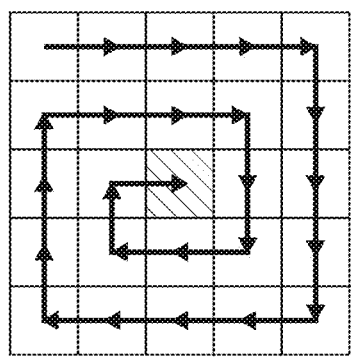
Figures 13E, 13F:
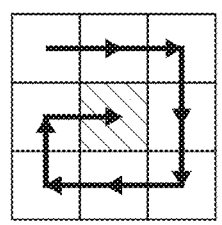

In FIGS. 11A-B, the computation cycles for the convolution of FIG. 10 is shown. In each cycle, each of the cores of array 1003 computes a partial sum and communicates it in the direction illustrated, until in the final cycle, the final total is written (e.g., to activation memory).

A variety of traversal paths may be used according to the present disclosure. In a neural core array with a network-on-chip that allows communication of data between adjacent cores, different traversal paths have different advantages and disadvantages. For example, a snake-like path can trace out an entire filter in one continuous trajectory, but does not terminate in the center of the filter, causing the layer outputs to be offset in the core array relative to the layer inputs. It is also discontinuous near the boundaries, so cores near the edge of the array must run different microcode and need extra memory to store temporary results.

A spiral-like path is also continuous except near the boundaries, but terminates in the center of the filter, so layer outputs are perfectly aligned with layer inputs within the core array. In various embodiments, a logical path terminates at its radial center.

A pinwheel-like path is discontinuous, so all cores require extra memory to store temporary results. However, it has no boundary effects, so cores all run the same microcode. In various embodiments, no step in the logical path moves away from its radial center along any dimension.

Referring to FIGS. 12A-F, the weight order and input order are illustrated for exemplary snake paths. In these exemplary embodiments, the computation of an output traverses the input tensor along a snake-like path. Because the snake path terminates in the corner of the filter instead of the center, the output map is offset relative to the input map. The input tensor may be traversed continuously by a single snake path, in which case the only discontinuities are near the boundaries of the input tensor. When the snake path crosses out of bounds, the partial sum is cached at an adjacent location that has not yet been visited. The snake path always crosses back into bounds at the cache location, and resumes the partial sum from that location. This, the partial sum memory requires only a single element to handle boundary conditions.

Referring to FIGS. 13A-F, the weight order and input order are illustrated for exemplary spiral paths. In these exemplary embodiments, the computation of an output traverses the input tensor along a spiral path. Because the spiral path terminates in the center of the filter, the output map is aligned with the input map. The input tensor may be traversed continuously by a single spiral path, in which case the only discontinuities are near the boundaries of the input tensor. When the spiral path crosses out of bounds, the partial sum is cached at an adjacent location that has not yet been visited. When the spiral path crosses back in bounds, it starts a new partial sum from that location, which is added to the original partial sum when the path arrives at the cache location. The partial sum memory depth required to handle boundary conditions is one less than the spiral radius.

Figure 14:
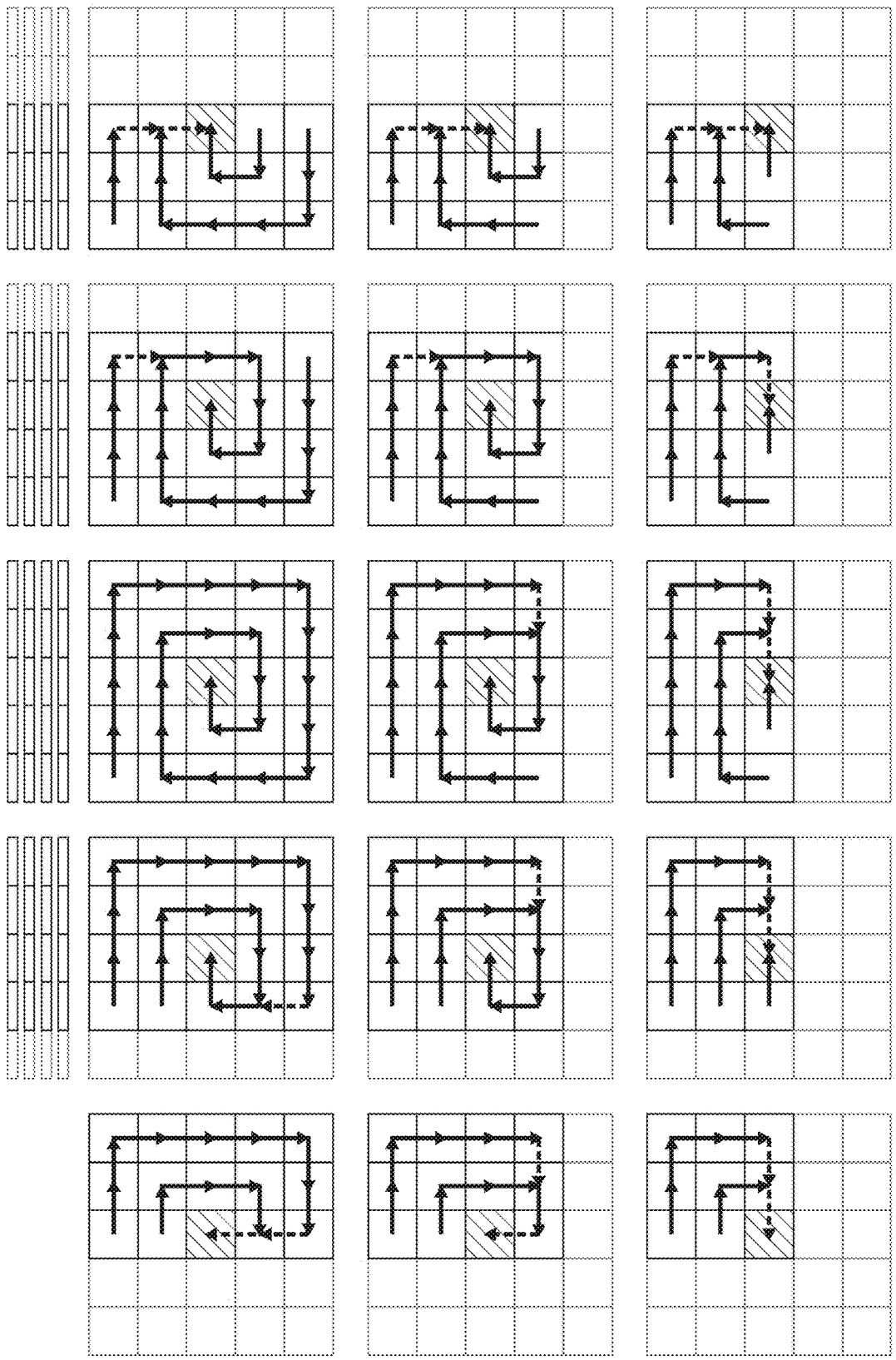
FIG. 14 illustrates exemplary spiral paths for a 5×5 input tensor according to embodiments of the present disclosure.
Figures 15A, 15B:
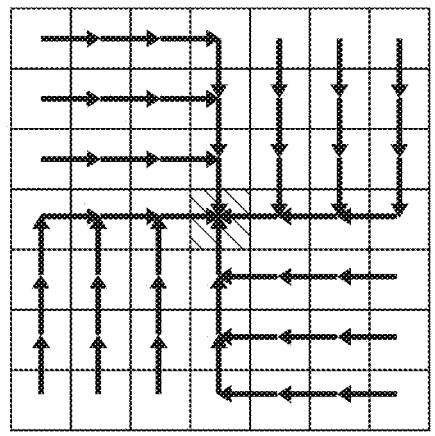
FIGS. 15A-F illustrates the weight order and input order for exemplary pinwheel paths according to embodiments of the present disclosure.
Figures 15C, 15D:
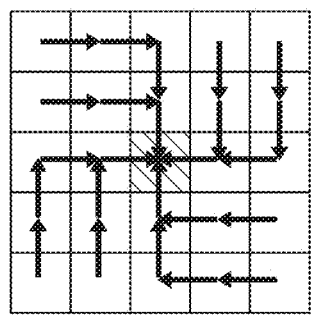
Figures 15E, 15F:
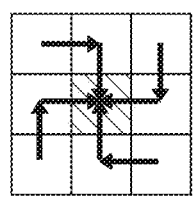

Referring to FIG. 14, exemplary spiral paths for a 5×5 input tensor is illustrated. In these examples, various shortcut paths are introduced for convolutions overlapping a boundary. Locations closer to the boundary incur more boundary crossings, each of which requires another partial sum to be cached. Accordingly, handling different boundary conditions requires cores to run different microcode.

Referring to FIGS. 15A-F, the weight order and input order are illustrated for exemplary pinwheel paths. In these exemplary embodiments, the computation of an output traverses the input tensor along a path resembling a pinwheel. Because the pinwheel path terminates in the center of the filter, the output map is aligned with the input map.

Traversing a discontinuous path like the pinwheel requires a partial sum memory as deep as the largest number of path discontinuities active at any time. The 3×3 pinwheel path has 4 separate branches, but only 1 discontinuity, at the center, so each core needs to store 1 partial sum to accumulate the result of each branch.

The 5×5 pinwheel path also has 4 branches, so each core needs to store 1 partial sum to accumulate branch results. Steps 3 and 4 are discontinuous, so each core also needs to store the result of step 3 until the path catches up with it in step 6, freeing the partial sum memory for reuse at the next discontinuity (between steps 9 and 10). So each core only ever needs to store 2 partial sums to traverse the entire path.

The 7×7 pinwheel path also only needs to store 2 partial sums. Traversing the path in a different order could increase the necessary partial sum memory. However, since every step in the path moves toward the center pixel, no additional partial sum memory is needed to handle boundary conditions.

Figure 16:
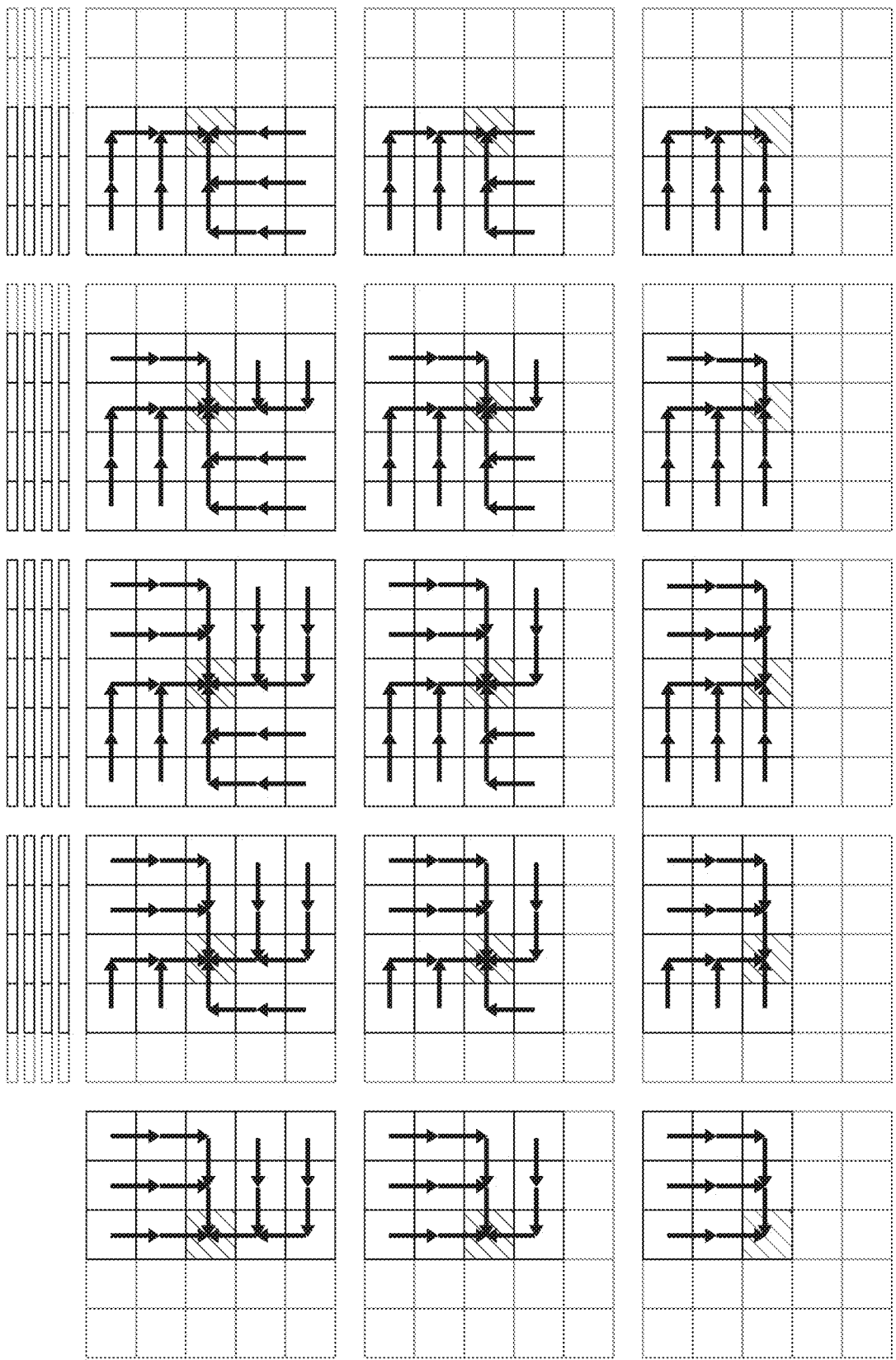
FIG. 16 illustrates exemplary pinwheel paths for a 5×5 input tensor according to embodiments of the present disclosure.
Figures 17A, 17B:
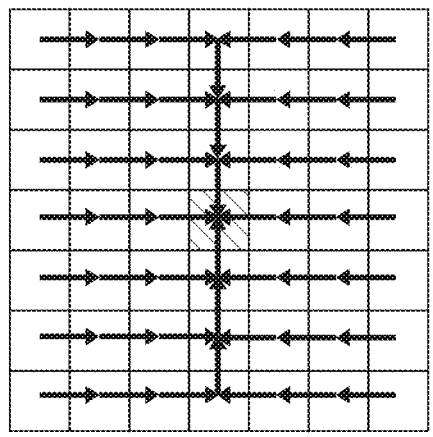
FIGS. 17A-F illustrates the weight order and input order for exemplary horizontal-vertical paths according to embodiments of the present disclosure.
Figures 17C, 17D:
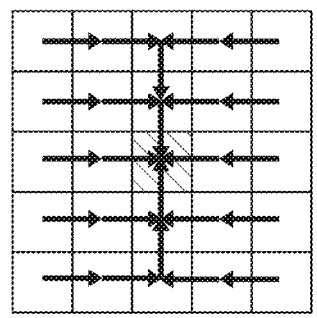
Figures 17E, 17F:
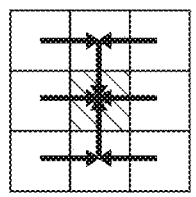

Referring to FIG. 16, exemplary pinwheel paths for a 5×5 input tensor is illustrated. If every step on a path moves toward the center pixel, then the path can never exit the core array no matter how close it gets to the boundary. Therefore, every core can run exactly the same microcode program (assuming implicit zero padding).

Referring to FIGS. 17A-F, the weight order and input order are illustrated for exemplary horizontal-vertical paths. In these exemplary embodiments, the computation of an output traverses the input tensor by scanning each row of pixels horizontally and collecting their output in a single column, which is then combined vertically. This has all of the advantages of the pinwheel path, but sequencing all horizontal moves before any vertical moves sometimes makes the microcode easier to write.

Figure 18:
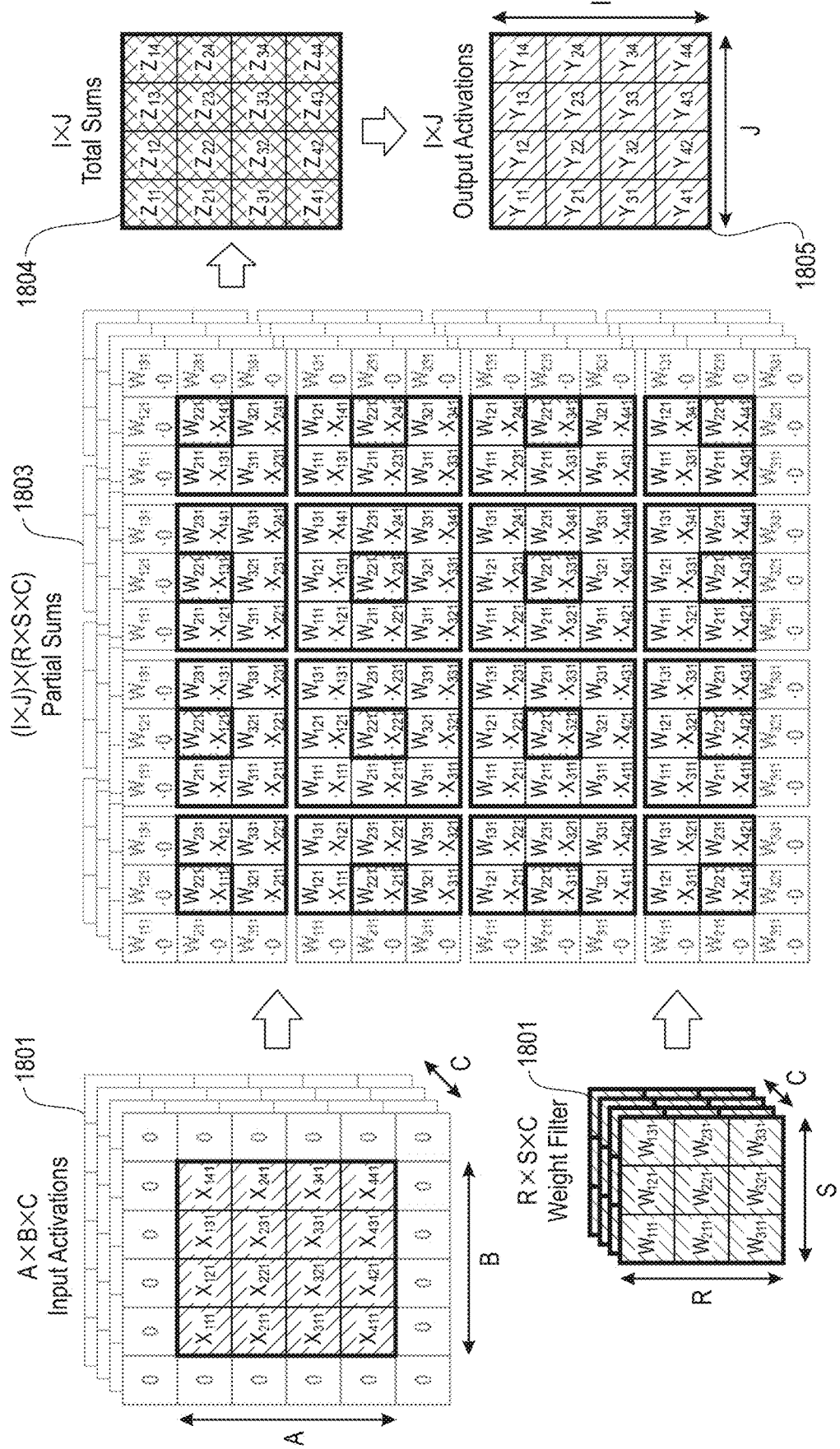
FIG. 18 illustrates an exemplary 3×3×4 convolution according to embodiments of the present disclosure.

Referring to FIG. 18, an exemplary 3×3×4 convolution is illustrated according to the present disclosure. In this example, an R×S×C weight filter 1801 is applied to A×B×C input activations 1802 (pictured here with zero-padding). The application of the weight filter to the segments of the input tensor yields partial sums 1803. Total sums 1804 are computed from partial sums 1803, where $$Z_{ij} = \sum_{r,s,c} W_{rsc} \cdot X_{(r-i+\lfloor \frac{R}{2} \rfloor)(s-j+\lfloor \frac{S}{2} \rfloor)c}$$

and zero-padding of the input activations sets $X_{abc}=0$ if $a \notin [1,A]$ or $b \notin [1,B]$. Output activations 1805 are computed from total sums 1804, where $Y_{ij}=\sigma(Z_{ij})$.

Figure 19C:
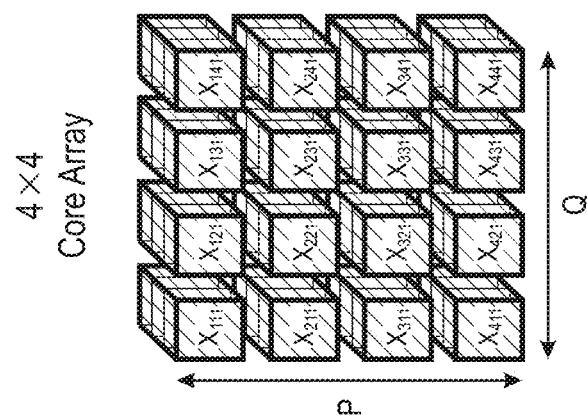
FIGS. 19A-C illustrate exemplary distributions of three-dimensional input activations among cores in an array according to embodiments of the present disclosure.
Figure 19B:
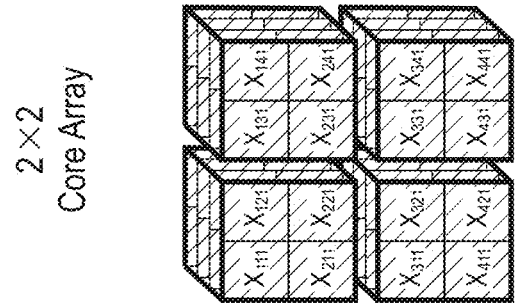
Figure 19A:
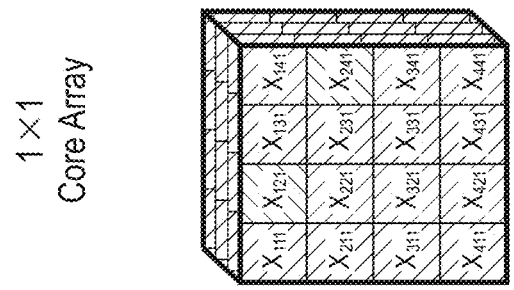

Referring to FIGS. 19A-C, exemplary distributions of a three-dimensional input tensor among cores in an array are illustrated. FIG. 19A shows an exemplary distribution over a 1×1 core array. FIG. 19B shows an exemplary distribution over a 2×2 core array. FIG. 19C shows an exemplary distribution over a 4×4 core array. In these examples, the two tensor dimensions that are distributed over the core array are interpreted as spatial dimensions.

Referring to FIG. 20, the weight order and input order are illustrated for exemplary computation paths for a three-dimensional input tensor that is distributed over cores in an array as in FIG. 19. In these exemplary embodiments, the computation path traverses the same horizontal-vertical paths in the spatial dimensions of the weight filter as in FIG. 17.

Figure 20A:
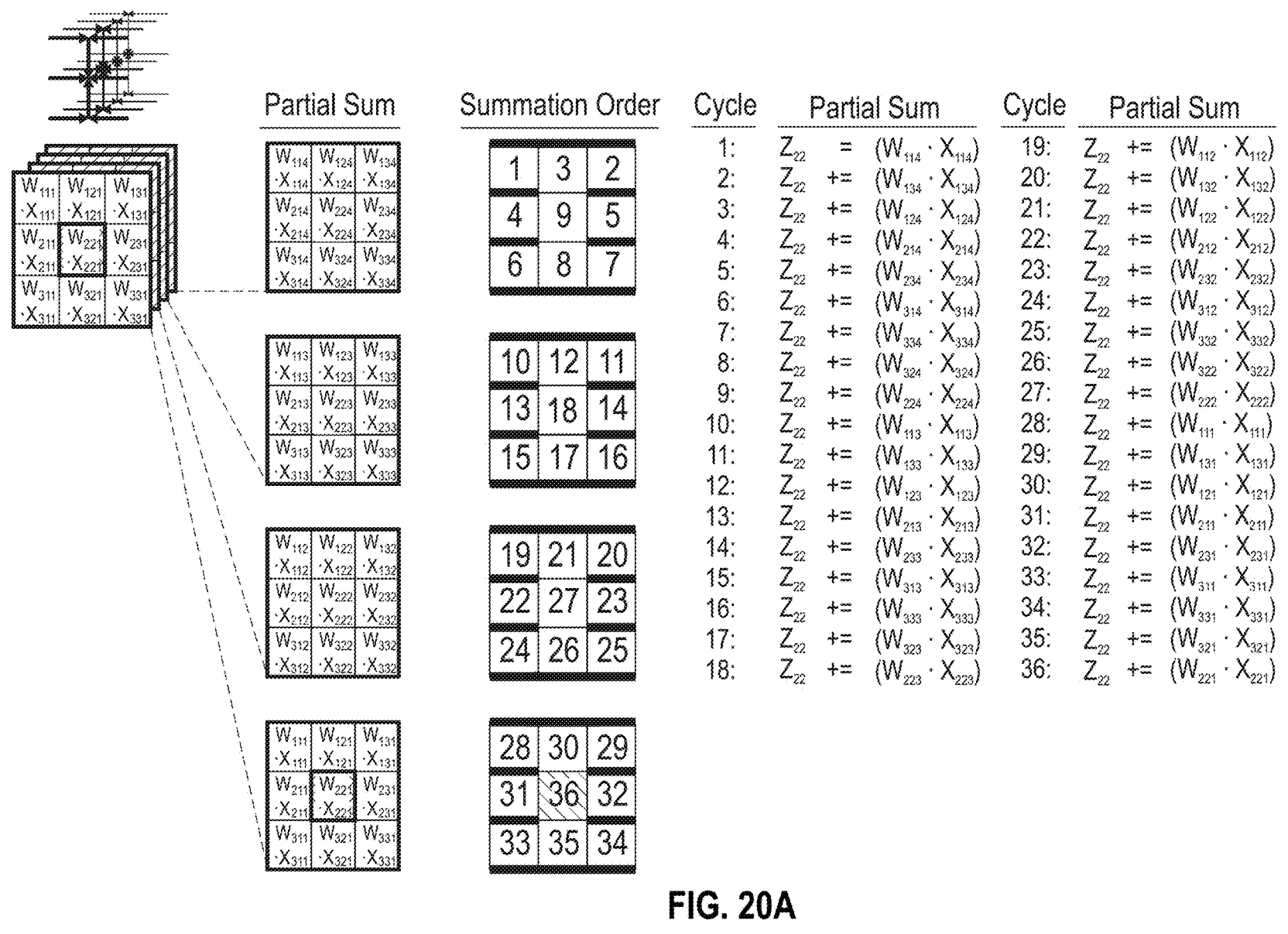

FIG. 20A shows an exemplary computation path that traverses every spatial location of the weight filter before advancing to the next location along the third dimension.

Figure 20B:
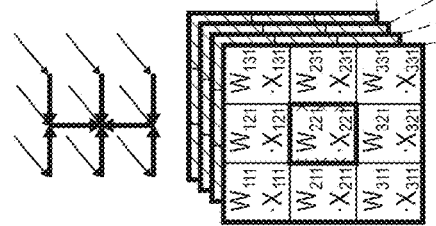

FIG. 20B shows an exemplary computation path that traverses every location along the third dimension of the weight filter before advancing to the next spatial location. This path allows a core to accumulate the entire partial sum for a given input activation before communicating any portion of that sum to an adjacent core, thereby reducing the number of partial sums that must be communicated between cores.

As set out above, the communication of data between cores may be implemented by a network-on-chip. In various embodiments, the network-on-chip uses a tree topology; a bus topology; a systolic topology; or a mixture of tree, bus, and/or systolic topologies.

In some embodiments, the network-on-chip is also used to distribute chip inputs to neural cores. In some embodiments, the network-on-chip is also used to aggregate chip outputs from neural cores.

In some embodiments, the network-on-chip is also used to distribute transient data to neural cores from a centralized data memory. In some embodiments, the network-on-chip is also used to aggregate transient data to a centralized data memory from neural cores.

A variety of networks are suitable for use according to the present disclosure, including those described in the commonly owned and invented U.S. patent application entitled NETWORKS FOR DISTRIBUTING PARAMETERS AND DATA TO NEURAL NETWORK COMPUTE CORES, filed concurrently herewith, which is hereby incorporated by reference in their entirety.

Figure 21:
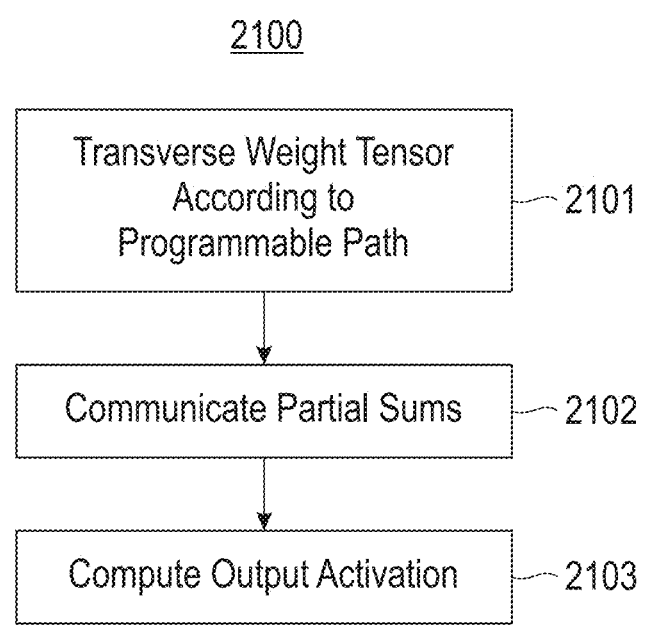
FIG. 21 illustrates a method of data distribution in an array of neural network cores according to embodiments of the present disclosure.

Referring now to FIG. 21, a method of data distribution in an array of neural network cores is illustrated according to embodiments of the present disclosure. At 2101, by each neural core of an array of neural cores, a weight tensor is applied to a plurality of input activations by traversing a weight tensor according to a programmable path to compute partial sums. At 2102, partial sums are communicated to at least one adjacent neural core within the array via a network. At 2103, at least one output activation of a neural network layer is computed from the partial sums.

Figure 22:
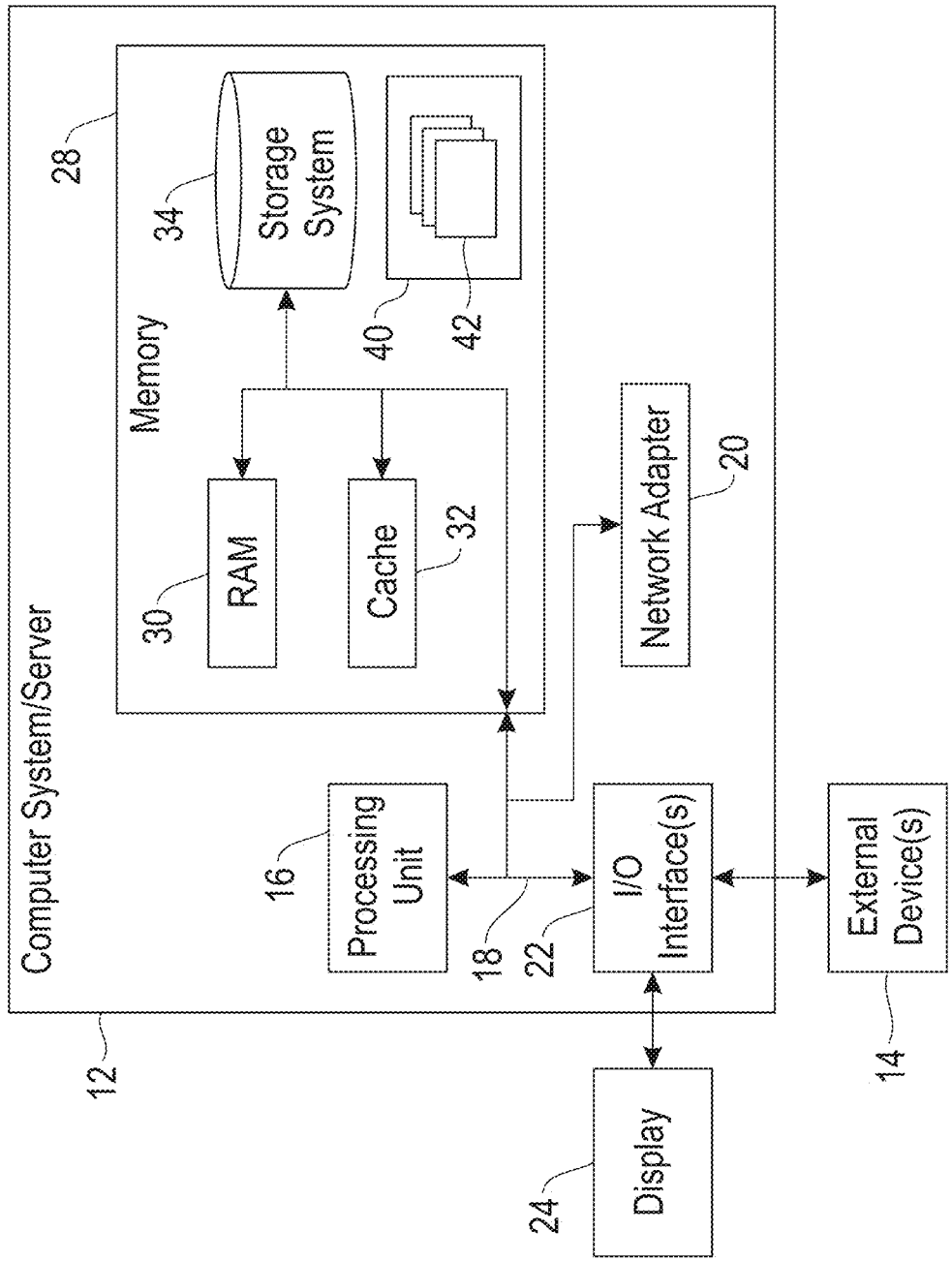
FIG. 22 depicts a computing node according to an embodiment of the present disclosure.

Referring now to FIG. 22, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 22, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
an array of neural cores adapted to compute, in parallel, an output activation tensor of a neural network layer;
a network operatively connected to each of the neural cores, wherein:
the output activation tensor is distributed across the array of neural cores;
an input activation tensor is distributed across the array of neural cores;
a weight tensor is distributed across the array of neural cores;
each neural core's computation comprises multiplying elements of a portion of the input activation tensor at that core with elements of a portion of the weight tensor at that core, and storing the summed products in a partial sum corresponding to an element of the output activation tensor;
each element of the output activation tensor is computed by accumulating all of the partial sums corresponding to that element via the network;
the partial sums for each element of the output activation tensor are computed in a sequence of steps whose order is described by tracing a path through the weight tensor that visits every weight tensor element that contributes to any partial sum.

2. The system of claim 1, wherein each neural core is configured to compute the at least one output activation from the partial sums.

3. The system of claim 1, wherein the network interconnects adjacent neural cores within the array.

4. The system of claim 1, wherein the network interconnects neighborhoods of neural cores within the array.

5. The system of claim 1, wherein the network interconnects all neural cores within the array.

6. The system of claim 1, wherein the path through the weight tensor is configurable in each core.

7. The system of claim 1, wherein the path through the weight tensor is continuous.

8. The system of claim 1, wherein the path through the weight tensor is discontinuous.

9. The system of claim 1, wherein the path through the weight tensor comprises a space-filling curve.

10. The system of claim 1, wherein the path through the weight tensor terminates at its radial center.

11. The system of claim 1, wherein no segment of the path through the weight tensor is directed away from its radial center.

12. The system of claim 1, wherein the path through the weight tensor comprises a serpentine path.

13. The system of claim 1, wherein the path through the weight tensor comprises a spiral path.

14. The system of claim 1, wherein the path through the weight tensor comprises a pinwheel path.

15. The system of claim 1, wherein the path through the weight tensor comprises a horizontal-vertical path.

16. The system of claim 1, wherein each neural core is adapted to execute microcode to compute and communicate partial sums.

17. The system of claim 16, wherein each neural core is loaded with the same microcode.

18. The system of claim 2, wherein the each neural core is further adapted to communicate the at least one output activation via the network.

19. The system of claim 1, wherein the path through the weight tensor is two-dimensional.

20. The system of claim 1, wherein the path through the weight tensor is three-dimensional.

21. A method comprising:
by each neural core of an array of neural cores, applying a weight tensor to a plurality of input activations to compute partial sums in a sequence of steps whose order is described by tracing a path through the weight tensor that visits every weight tensor element that contributes to any partial sum;
communicating partial sums to at least one adjacent neural core within the array via a network.

22. The method of claim 21, further comprising:
computing at least one output activation of a neural network layer from the partial sums.

23. The method of claim 21, wherein the network interconnects adjacent neural cores within the array.

24. The method of claim 21, wherein the network connects neighborhoods of neural cores within the array.

25. The method of claim 21, wherein the network connects all neural cores within the array.

* * * * *